Aug. 23, 1932.  E. W. ALLBRIGHT  1,873,525
SEAT CONSTRUCTION FOR SEDAN TYPE AUTOMOBILES
Filed Oct. 30, 1930  2 Sheets-Sheet 1

Inventor
Edward W. Allbright
by Hazard and Miller
Attorneys

Aug. 23, 1932. E. W. ALLBRIGHT 1,873,525
SEAT CONSTRUCTION FOR SEDAN TYPE AUTOMOBILES
Filed Oct. 30, 1930 2 Sheets-Sheet 2
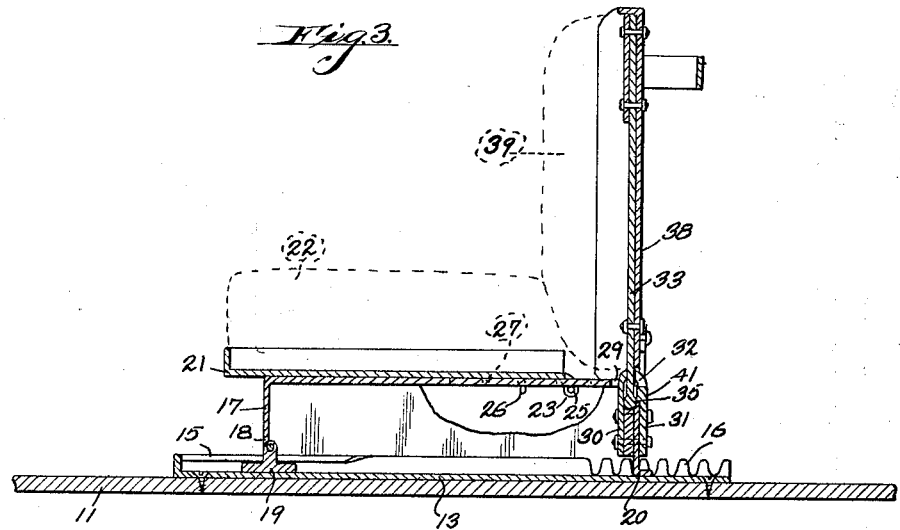
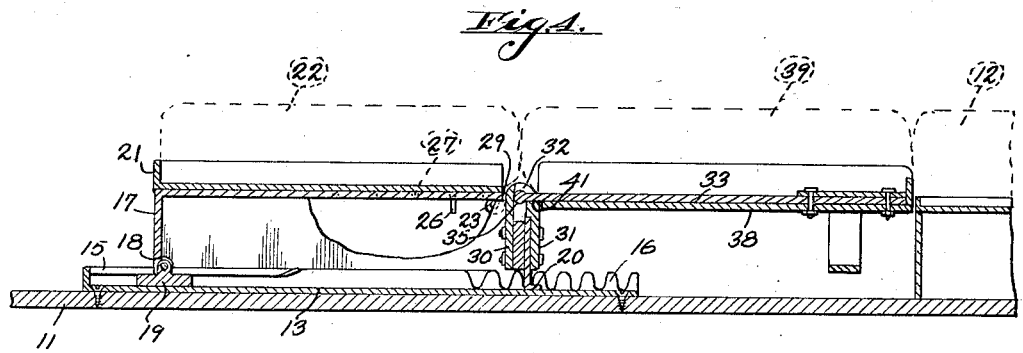
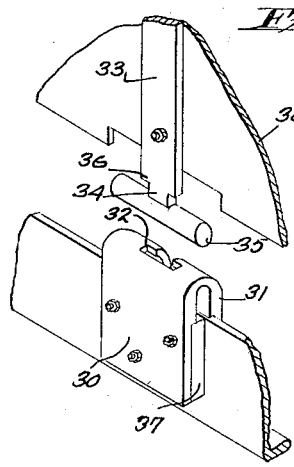
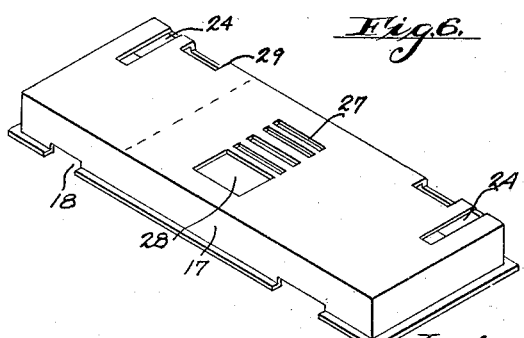
Inventor
Edward W. Allbright
by Hazard and Miller
Attorneys Patented Aug. 23, 1932

1,873,525

UNITED STATES PATENT OFFICE

EDWARD W. ALLBRIGHT, OF LOS ANGELES, CALIFORNIA

SEAT CONSTRUCTION FOR SEDAN TYPE AUTOMOBILES

Application filed October 30, 1930. Serial No. 492,233.

This invention relates to a seat construction for sedan type automobiles.

It is an object of the invention to provide a novel front seat construction for automobile bodies of the sedan type which will enable the back rest of the front seat to be swung rearwardly into an approximately horizontal position so as to cooperate with the cushions of the front and back seats to form a bed.

In various types of automobiles the distance between the front and back seats is otherwise than equal to the width or height of the back rest of the front seat so that when the back rest of the front seat is swung rearwardly into its horizontal position there is a gap between the back rest and the rear seat cushion which must be filled to form an even supporting structure for sleeping purposes. In the present construction the front seat is made bodily adjustable longitudinally of the car so that the position of the front seat can be varied and likewise the position of the back rest while in horizontal position can be adjusted to cause it to snugly fit against the front of the back seat cushion, thus providing a substantially continuous supporting construction.

Another object of the invention is to provide a novel front seat construction having a back rest which can be swung rearwardly into horizontal position wherein there is a novel locking mechanism for holding the back rest in upright position for driving purposes.

Another object of the invention is to provide a novel front seat construction for sedan type automobiles having a base on which a back rest is mounted capable of swinging rearwardly into a horizontal position to form a bed and having a seat cushion supporting member which is adjustable on the base so that when the back rest is in horizontal position the seat cushion supporting member may be adjusted to adjust the cushion and cause it to fit snugly against the back rest so that no objectionable gap will be present between the back rest and the seat cushion.

A further object of the invention is to provide a front seat construction for sedan type automobiles which is adjustable in many respects to suit the convenience and which is so constructed that the front seat can be easily removed bodily from the interior of the car.

With the foregoing and other objects in view, which will be made manifest in the following detailed description, and specifically pointed out in the appended claims, reference is had to the accompanying drawings for an illustrative embodiment of the invention, wherein:

Fig. 3 is a transverse section through the front seat illustrating the back rest in upright position.

Fig. 4 is a similar view to Figure 3 illustrating the back rest in horizontal position.

Fig. 5 is a partial view in perspective illustrating parts of the hinge I preferably employ in disassembled condition.

Fig. 6 is a perspective view of the base of the front seat.

Figure 1:
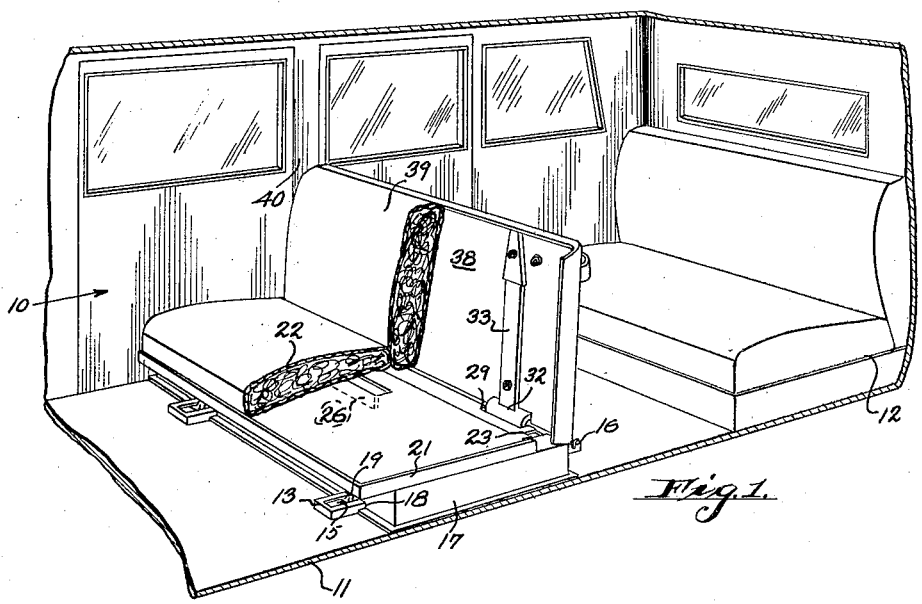
Fig. 1 is a partial view in perspective illustrating the improved front seat construction, the back rest of the front seat being shown in upright position.
Figure 2:
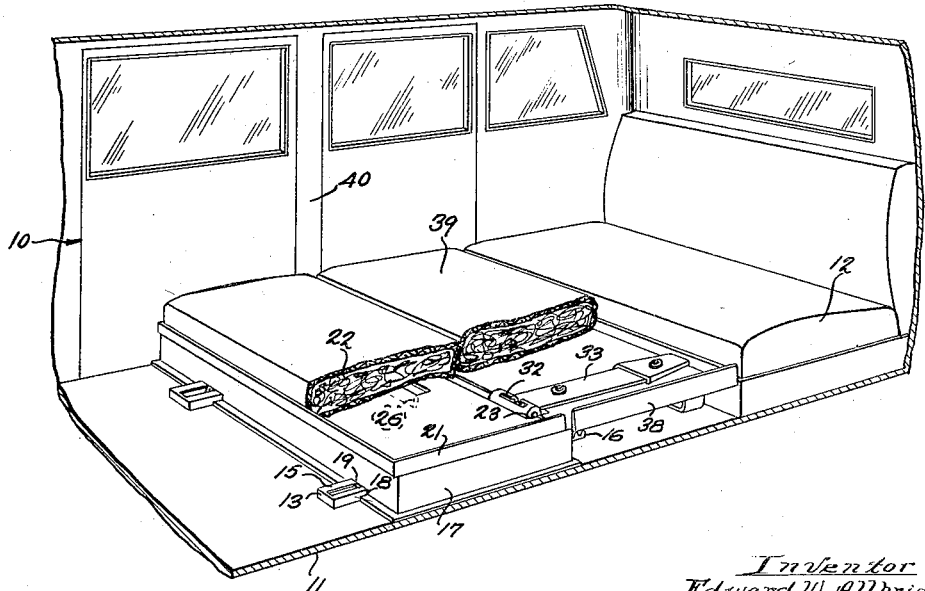
Fig. 2 is a view similar to Figure 1 illustrating the back rest in horizontal or bed forming position.

Referring to the accompanying drawings, wherein similar reference characters designate similar parts throughout, the body of the automobile is generally designated at 10, having a floor 11 and a back seat 12 which may be of any conventional or preferred construction. On the floor 11 at about the location of the front seat there are secured channels 13 the sides of which near their forward ends have inwardly extending flanges 15 so that the channels near their forward ends are substantially dovetailed in construction. The rear ends of the channels are notched as indicated at 16. Over the channels there is positioned a front seat base 17, having a front, back, and sides, together with a top. The front of the base is preferably notched as at 18 to receive the forward ends of the channels. Slides 19 are pivoted to the front of the base and are adapted to enter a slide within the dovetailed forward ends of the channels. The rear of the base indicated at 20 provides portions receivable selectively in notches 16 so that by lifting the rear end of the base upwardly to disengage a notch the base can be caused to slide forwardly or backwardly on the channels. On subsequently lowering the base the portion 20 will enter a notch 16 and lock the base in adjusted position.

A cushion supporting member is provided indicated at 21, having upwardly turned sides to confine therein a front seat cushion 22. At the rear of this cushion retaining member there are downwardly extending knuckles 23 extending through slots 24 in the top of the base and carrying pins 25 which project laterally beneath the top of the base so as to anchor the rear end of the cushion supporting member 21 to the base. Near the center of the cushion supporting member 21 there is a downwardly extending lug 26 which is receivable in either of a plurality of apertures 27 formed in the top of the base. By lifting the forward end of the cushion supporting member the lug 26 can be withdrawn from its aperture 27 and the cushion supporting member can be caused to slide forward or backward to adjust it with respect to the base. On lowering it the lug 26 enters an aperture 27 to lock the cushion supporting member 21 in adjusted position. A large aperture 28 may be formed in the top of the base providing access to a tool compartment which may be provided on the interior of the base. This tool compartment will be normally closed by the cushion supporting member 21 resting flatly on the top of the base.

The back of the base is recessed as indicated at 29 to permit the application of hinges. Each hinge, as clearly shown in Figure 5, consists of a socket member or knuckle formed by a section of metal reversely bent upon itself to provide sides 30 and 31 joined at their upper ends by a rounded edge. A T shaped slot 32 is formed in this section with the narrow portion of the slot disposed on side 31. The wide portion of the slot is arranged on the rounded edge. The opposite part of each hinge comprises a tongue 33 having adjacent its lower end a neck 34 and a cylindrical laterally extending head 35. The cylindrical head 35 when the parts are assembled fits between sides 30 and 31 below the rounded edge. The neck 34 is narrow enough so that it can swing through the narrow portion of the T shaped slot. The shoulders 36 at the base of the neck can be passed through the wide portion of the T shaped slot. A spacer 37, which spaces the lower ends of the sides 30 and 31, has its top edge disposed beneath the rounded edge a distance sufficient to permit the head 35 to slide downwardly between the sides to cause shoulders 36 to enter the wide portion of the T shaped slot. The tongues 33 are secured to the frame 38 of the front seat back rest, which may have its forward side suitably upholstered with a cushioning construction 39, as is conventional.

The operation and advantages of the improved seat construction are as follows. In normal condition wherein the back rest is upright, the weight of the back rest causes the tongues 33 to move downwardly into the wide portion of the T shaped slot. As the shoulders 36 fit in the wide portion of the T shaped slot the back rest will be held against swinging movement or be locked in upright position. In this manner the back rest will be held in upright position without requiring any connection between the back rest and the door post 40 arranged between the doors. When it is desired to convert the seats into a bed the back rest is bodily lifted to withdraw the shoulders 36 from the slot. When thus lifted the back rest can be swung rearwardly and downwardly about the cylindrical heads 35 which constitute pintles until the tongues engage shoulder 41 at the bottom of the narrow portion of each T shaped slot. When the shoulder 41 is engaged the back rest will be supported in approximately horizontal position as shown in Figure 4. In the event that there is a gap present between the back rest and the cushion of the back seat the base 17 can be lifted to disengage locking member 20 from its notch 16 and the base can be bodily moved rearwardly to close the gap, causing the back rest to fit snugly against the back seat cushion, and on dropping the base it will again enter a notch 16 and lock itself in adjusted position.

A comparison of Figure 3 with Figure 4 clearly indicates that a mere swinging rearwardly of the back rest into horizontal position would leave a gap between the back rest and the front seat cushion 22. This gap is closed by lifting the cushion supporting member 21 to disengage lug 26 and sliding it rearwardly until the cushion engages the back rest, closing the gap. When this adjustment has been effected the two cushions and the back rest cooperate together to form a substantially continuous mattress which will serve admirably for sleeping purposes. I find that in many instances the front of the back seat cushion is manufactured so as to be thicker than its rear and in such circumstances I find it advantageous to take out the back seat cushion and reverse it so that the thick portion of the cushion will be immediately below the back seat back rest. It will appreciated that the above described construction permits of a considerable adjustment so that the two cushions and the back rest can be brought into engagement with each other, forming a continuous mattress. The adjustable base for the front seat not only assists in accomplishing this but permits the entire front seat to be adjusted with respect to the steering wheel to suit the driver's convenience.

Under some circumstances it may be desirable for certain purposes to remove the front seat entirely from the body. This can be easily accomplished by lifting the back of the base to disengage notches 16 and pulling the base rearwardly. As soon as the slides or shoes 19 pass from beneath the rear ends of flanges 15 the base and all of the construction mounted thereon can be bodily taken out of the car through one of the doors.

To restore the seat construction to its normal or driving position the forward end of the cushion supporting member 21 is lifted to disengage lug 26 and is brought forwardly. The back rest is then swung upwardly into upright position and as the shoulders 36 reach positions over the wide portion of the T shaped slot 32 the weight of the back rest shifts the tongues 33 bodily downward. This causes the shoulders 36 to enter the slot and the back rest will thus be kept in upright position with its weight keeping the shoulders in the slot. The cushion supporting member 21 can then be forced rearwardly to fit snugly against the back rest and the lug 26 dropped into one of the apertures 27. The base can then be adjusted forwardly or backwardly to suit the driver to position the back rest the desired distance from the steering wheel.

From the above described construction it will be appreciated that the improved automobile body is constructed in a novel manner which readily permits the use of the cushions and the back rest to form a comfortable sleeping support.

Various changes may be made in the details of construction without departing from the spirit or scope of the invention as defined by the appended claims.

I claim:

1. A vehicle body having a back seat, a base for the front seat, a back rest for the front seat, means connecting the back rest to the base enabling the back rest to assume a substantially horizontal position forwardly of the back cushion, a front seat cushion, means adjustably mounting the front seat cushion upon the base enabling the front seat cushion to be adjusted to fit snugly against the back rest in either horizontal or upright positions, and means connecting the base to the floor of the body enabling adjustment of the base longitudinally of the body so that the back rest may be caused to fit snugly against the back cushion when in horizontal position.

2. A vehicle body construction having a back seat, a front seat base adjustably mounted upon the body for adjustment toward and away from the back seat, means for locking the front seat base in adjusted position, a front seat back rest mounted for pivotal movement relatively to the front seat base adapted to assume an upright position or a horizontal position, a front seat cushion adjustably mounted upon the front seat base, and means for locking the front seat cushion in adjusted position.

3. A seat construction for vehicles comprising a seat base, a cushion on the base, knuckles mounted at the rear of the base having slots formed therein, said slots having wide portions at the tops of the knuckles and narrow portions extending down the rear sides of the knuckles, a back rest, said back rest having arms provided with narrow portions receivable through the narrow portions of the slots adapted to engage the bottoms of the narrow portions of the slots to limit swinging movement of the back rest to a horizontal position, said arms having wide portions above the narrow portions receivable in the wide upper portions of the slots to lock the back rest in an upright position, and means carried by the lower ends of the arms and disposed within the knuckles for pivotally and slidably connecting the arms and knuckles together.

In testimony whereof I have signed my name to this specification.

E. W. ALLBRIGHT.